United States Patent
Anselment et al.

(10) Patent No.: US 9,678,302 B2
(45) Date of Patent: Jun. 13, 2017

(54) ADJUSTMENT APPARATUS FOR AN OPTICAL ELEMENT

(71) Applicant: SICK AG, Waldkirch (DE)

(72) Inventors: Christoph Anselment, Waldkirch (DE); Jakob Burger, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 14/968,375

(22) Filed: Dec. 14, 2015

(65) Prior Publication Data
US 2016/0209619 A1 Jul. 21, 2016

(30) Foreign Application Priority Data
Jan. 20, 2015 (DE) .................. 10 2015 100 718

(51) Int. Cl.
| | | |
|---|---|---|
| H04N 5/232 | (2006.01) | |
| G02B 7/04 | (2006.01) | |
| G03B 3/10 | (2006.01) | |
| G02B 7/08 | (2006.01) | |
| G02B 7/36 | (2006.01) | |

(52) U.S. Cl.
CPC ............. *G02B 7/04* (2013.01); *G02B 7/08* (2013.01); *G03B 3/10* (2013.01); *H04N 5/23212* (2013.01); *G02B 7/36* (2013.01)

(58) Field of Classification Search
CPC ... G02B 7/04; G02B 7/36; G02B 7/08; G03B 3/10; G03B 13/34; H04N 5/23212
See application file for complete search history.

(56) References Cited

U.S. PATENT DOCUMENTS

| | | | |
|---|---|---|---|
| 477,352 A | 6/1892 | Cottrell | |
| 2,155,391 A | 4/1939 | Arden | |
| 3,496,851 A | 2/1970 | Himmelsbach | |
| 4,585,313 A | 4/1986 | Iwata | |
| 8,396,357 B2 * | 3/2013 | Yanagisawa | G02B 7/08 348/208.7 |
| 8,740,083 B2 * | 6/2014 | Anselment | G02B 7/08 235/462.22 |
| 2005/0040237 A1 | 2/2005 | Ito et al. | |

FOREIGN PATENT DOCUMENTS

| | | |
|---|---|---|
| DE | 197 21 824 A1 | 3/1998 |
| EP | 2498113 B1 | 9/2012 |
| JP | S61199076 A | 9/1986 |

* cited by examiner

*Primary Examiner* — Twyler Haskins
*Assistant Examiner* — Angel L Garces-Rivera
(74) *Attorney, Agent, or Firm* — Nath, Goldberg & Meyer; Jerald L. Meyer; Annie J. Kock

(57) ABSTRACT

An adjustment apparatus (20) for an optical element (12) of an optoelectronic sensor (10) is provided comprising a drive (32), a cam disk (22) rotatable by the drive (32) and a transmission element (26) which is in contact with a periphery of the cam disk (22) and is connected to the optical element (12) in order thus to convert a rotary movement of the cam disk (22) into an adjustment movement of the optical element (12). In this respect, the cam disk (22) is manufactured from metal in an etching technology.

7 Claims, 3 Drawing Sheets

ADJUSTMENT APPARATUS FOR AN OPTICAL ELEMENT

Figure 1:
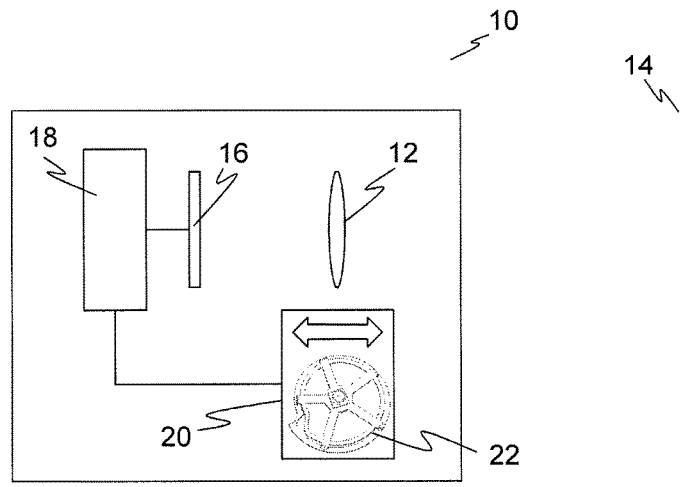

The invention relates to an adjustment apparatus for an optical element of an optoelectronic sensor comprising a drive, a cam disk rotatable by the drive and a transmission element which is in contact with a periphery of the cam disk and is connected to the optical element in order thus to convert a rotary movement of the cam disk into an adjustment movement of the optical element.

Optical elements moved by a motor are required for some adaptations of optoelectronic sensors. An important example is a focal adjustment by which lenses or objectives are moved to focus a transmitted beam or to take sharp images across a required working region. This is usually associated with an autofocus with which the spacing from the relevant object is determined and the focal position is set accordingly.

A known focal adjustment uses an eccentric unit on which an eccentrically supported ball bearing rolls off, for example onto a steel shaft. The adjustment in this respect utilizes at most half a revolution. On a drive having a stepper motor, the adjustment path is therefore limited to half a revolution; the marginal regions are unusable due to too small a resolution.

Cam disks having a linear pitch over the whole revolution can therefore be used to increase the adjustment precision per step. The adjustment movement takes place via a ball bearing rolling off on the cam disk. Such a focal adjustment in which an objective can be moved by a cam disk in a parallel guide is known form EP 2 498 113 B1. This cam disk is, however, manufactured as an injection molded plastic part for reasons of cost and therefore becomes a component which limits service life.

It is therefore the object of the invention to provide an improved adjustment apparatus for an optical element.

This object is satisfied by an adjustment apparatus for an optical element of an optoelectronic sensor in accordance with claim 1.

The adjustment apparatus utilizes a cam disk and a transmission element which is in contact with the periphery of said cam disk. Since the cam disk has a radius which varies over the periphery, which in particular increases in a linear manner, it generates a linear adjustment movement during a rotary movement which acts on the optical element by the transmission element. The invention starts from the basic idea of manufacturing the cam disk from metal. This is achieved very precisely and simply by a technical etching manufacture.

The invention has the advantage that the cam disk is very robust and has a long life. At the same time, the cam disk provides the transmission element with an extremely smooth roll-off edge. The cam disk can be manufactured precisely by means of etching technology and above all inexpensively in comparison with other techniques for metal treatment. In a CNC manufacture (computerized numerical control), for instance, a cam disk would be produced which is heavier and has a worse roll-off quality despite the high manufacturing costs. The invention is thus successful in combining the high service life of a ball bearing rolling off on a steel shaft with the considerably better adjustability via a cam disk, without substantially changing the manufacturing costs.

The cam disk is preferably manufactured from hardened steel. The cam disk is thereby particularly resistant and has a particularly long life.

The transmission element preferably has a ball bearing. The ball bearing rolls off on the etching edge which is particularly smooth. The adjustment apparatus thus works with high precision over very long time periods.

The cam disk preferably has a first wheel in contact with the transmission element and a second wheel which is connected to the first wheel and which is formed as a spoked wheel. This two-part cam disk utilizes the first wheel to convert the rotary movement into an adjustment movement at its periphery. A second wheel is connected to the drive. A larger degree of freedom thereby arises for the first wheel since it does not itself require any connection to a shaft at its center. Both wheels can be manufactured from metal in etching technology and can subsequently be connected to one another by means of laser welding, for example. The second wheel can be manufactured from a different metal than the first wheel, for example from a non-hardened steel, since it is not mechanically loaded by the transmission element.

The first wheel is preferably formed as a ring and the transmission element has a bearing and a counter-bearing which are outwardly and inwardly in contact with the first wheel. The first wheel therefore has a free inner space in which a counter-bearing can move. This is possible because the support at the center of the cam disk takes place at a shaft of the drive via the second wheel. The bearing and counter-bearing are preferably opposite one another perpendicular to the cam disk.

The adjustment apparatus is preferably a focal adjustment and the optical element is an objective. The position of an objective or of at least one lens is therefore adjusted. This is a particularly frequent function of an optoelectronic sensor having a part which is moved by a motor and this function is satisfied precisely and robustly.

In a preferred further development, a camera is provided with an adjustment apparatus in accordance with the invention which has an image sensor in whose optical axis an objective having the object element is arranged downstream so that, on an actuation of the drive by moving the cam disk, the focal position of the objective can be set. The camera is even more preferably configured as a camera-based code reader and has an evaluation unit which is configured to read out and output code information of a recorded code from image data of the image sensor. Camera-based code readers require sharp images to a high degree to detect the complete code information. At the same time, a fast and frequent focal adjustment is required in conventional applications so that the robust, fast and exact focusing achieved with the invention is particularly well suited over a large number of adjustment cycles.

Figure 2:
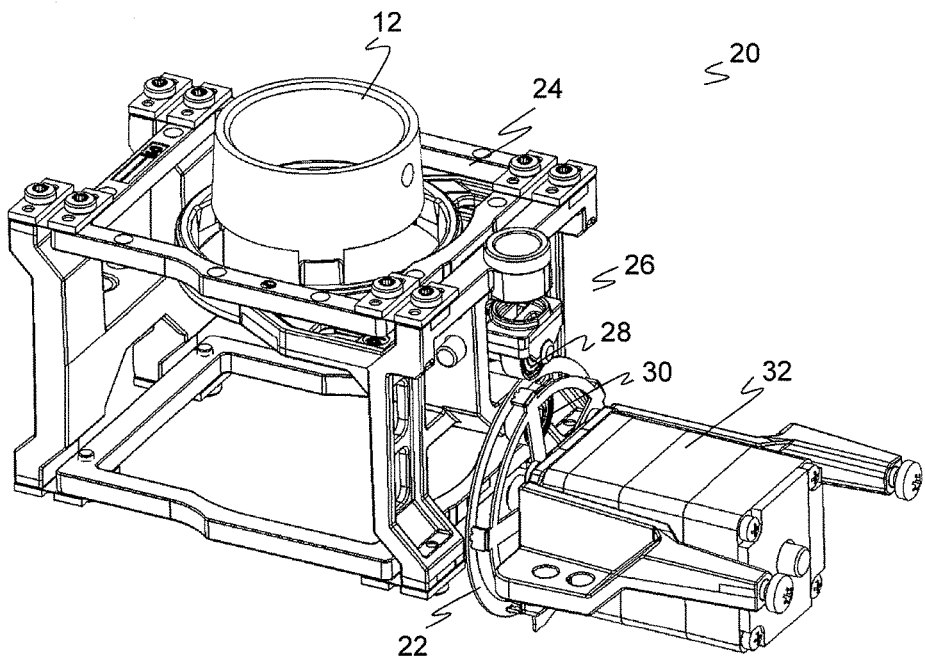
Figure 3:
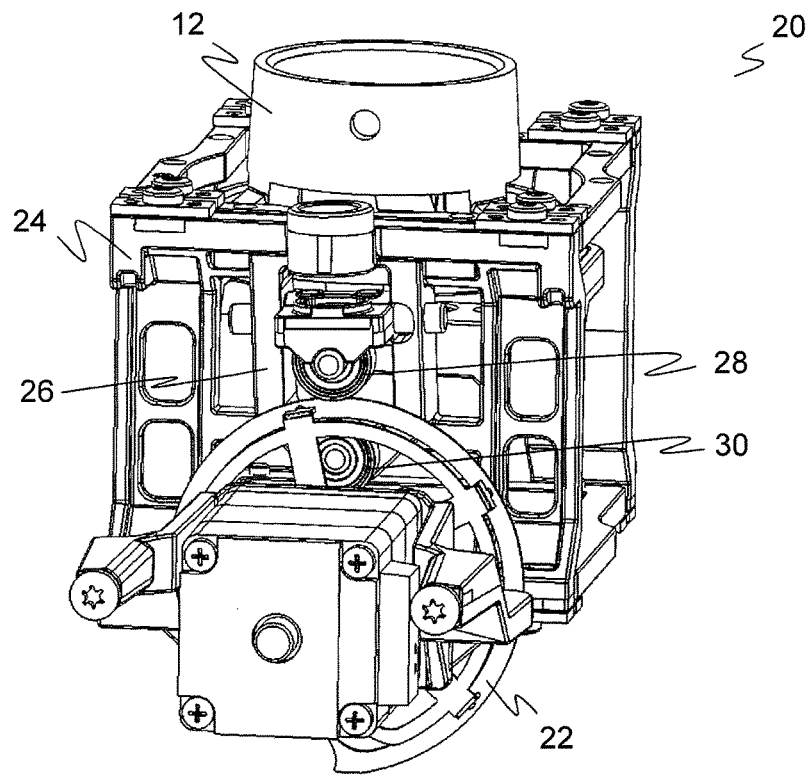
Figure 4:
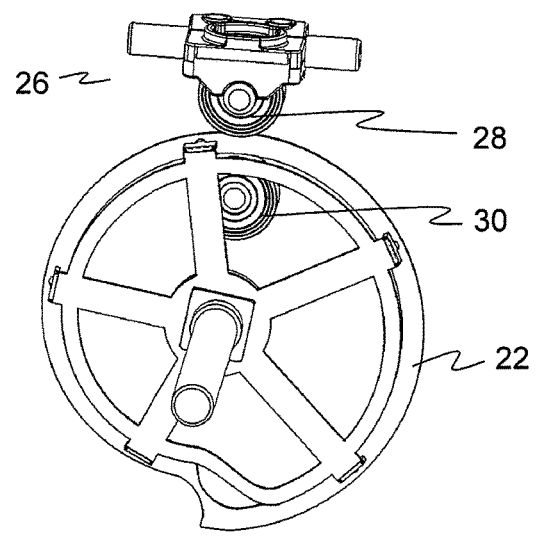
Figure 5:
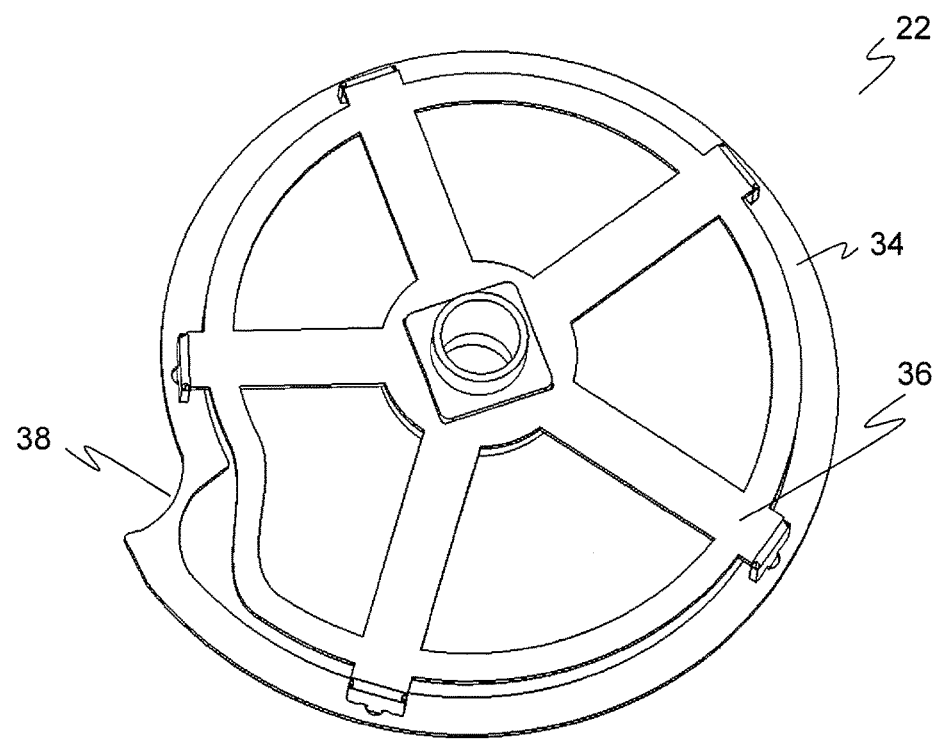

The invention will be explained in more detail in the following also with respect to further features and advantages by way of example with reference to embodiments and to the enclosed drawing. The Figures of the drawing show in:

FIG. 1 a simplified block diagram of a camera with a focal adjustment;

FIG. 2 a three-dimensional view of an exemplary focal adjustment with a cam disk;

FIG. 3 a view in accordance with FIG. 2 from a different perspective in a plan view of the cam disk;

FIG. 4 a view similar to FIG. 3, but with removed elements except for the cam disk and ball bearings of a transmission element rolling off thereon; and FIG. 5 a three-dimensional view of a cam disk.

FIG. 1 shows a very simplified block representation of a camera 10. Light is conducted via an objective 12, which is only shown by a simple lens, from a scenery 14 onto an image sensor 16 and is forwarded from there in the form of electrical image data to an evaluation unit 18. To focus the camera 10 to a specific distance, a focal adjustment unit 20 is provided which is controlled by the evaluation unit 18.

An exemplary embodiment of a focal adjustment unit 20 with a cam disk will be explained in more detail further below with reference to FIGS. 2 to 4. The focal adjustment unit 20 has a cam disk 22 whose rotary movement is mechanically converted into a linear adjustment movement of the objective 12.

In this respect, the cam disk 22 has to withstand very long operating durations and a large number of adjustment cycles and is therefore produced in etching technology with its high precision in manufacture from hardened steel sheet parts of any desired contours. Etching technology is known per se and is not a subject of this application, but was not previously used for transmission elements rolling off on ball bearings for the adjustment of optical components in optoelectronic sensors.

The camera 10 with the focal adjustment 20 only serves as an example for an optical element moved by a motor. A focusing at the transmission side or the movement of another optical element, for instance of a deflectable mirror, are also conceivable.

FIGS. 2 to 4 show a possible embodiment of a focus adjustment unit 2 for a camera 10. In this respect, FIG. 2 is a three-dimensional overall view obliquely from above; FIG. 3 is a further three-dimensional view, but now from the front of the cam disk 22; and FIG. 4 is a part view similar to FIG. 3, but with removed elements.

The objective 12 is supported in a parallel guide 24 in the focus adjustment unit 20. The objective 12 can be moved up and down in the parallel guide 24 for setting a desired focal position by means of a transmission element 26. The transmission element 26 has a ball bearing 28 which rolls off outwardly on the cam disk 22 and a counter-bearing 30. A rotary movement of the cam disk 22 produced by a drive 32, for example by a stepper motor, is thus transferred into a translation movement of the objective 12 with a parallel shift of the objective plane.

As can best be recognized in FIG. 4, the cam disk 22 runs free of clearance in a double ball bearing arrangement of ball bearing 28 and counter-bearing 30. In this respect, the counter-bearing 30 takes up the force of the ball bearing 28 and of a possible spring arrangement by which the ball bearing 28 is pressed onto the cam disk 22 to achieve the freedom from clearance and thus conducts it away from a shaft of the drive 32.

FIG. 5 shows the cam disk 22 alone again in a three-dimensional view. In order also to allow a rotation of the cam disk 22 on a use of the counter-bearing 30, the cam disk 22 is designed in two parts as a combination of parts manufactured in an etching technology. A first wheel 34 has the actual contour of the cam disk 22 with a radius varying over the periphery in a desired manner. The first wheel 34 is, however, of a ring-shaped design, that is it does not have any material in the interior. The ball bearing 28 can thereby roll off on the first wheel 34 outwardly and the counter-bearing 30 inwardly. The support on a shaft of the drive 32 takes place with the aid of a second wheel 36 which is formed, for example, as a spoked wheel and is likewise manufactured in etching technology. The connection of the two wheels 34, 36 can take place by means of laser welding.

The cam disk 22, in particular its first wheel 34, preferably has a uniform, constant pitch over the total periphery. A linear transmission between the rotary movement of the cam disk 22 and a displacement of the objective 12 can thus be achieved. In a comparatively very steep transition region 38, the radius is led back to the starting value after one revolution.

A smooth etching edge on which the ball bearing 28 or the counter-bearing 30 rolls off, which is free of jerks and which is comparable with a ground cylindrical pin, is produced by manufacturing the cam disk 22 in an etching technology. In addition, other cam disks 22 having different pitch relationships can be realized inexpensively. Unlike with a conventional cam disk in injection molding technology, for example, no new tool is required for this. No dirt particles can be deposited at the contact points on the running surface due to the thin design of the cam disk 22 which forms a linear support surface on the ball bearing 28 or on the counter-bearing 30.

The invention claimed is:

1. An adjustment apparatus for an optical element of an optoelectronic sensor, the adjustment apparatus comprising:
   drive,
   a cam disk rotatable by the drive, and
   a transmission element which is in contact with a periphery of the cam disk and is connected to the optical element in order thus to convert a rotary movement of the cam disk into an adjustment movement of the optical element, wherein the cam disk is produced from metal in an etching technology,
   wherein the cam disk has a first wheel in contact with the transmission element and a second wheel which is connected to the first wheel and which is formed as a spoked wheel.

2. The adjustment apparatus in accordance with claim 1, wherein the cam disk is manufactured from hardened steel.

3. The adjustment apparatus in accordance with claim 1, wherein the transmission element has a ball bearing.

4. The adjustment apparatus in accordance with claim 1, wherein the first wheel is formed as a ring and the transmission element has a bearing and a counter bearing which are inwardly and outwardly in contact with the first wheel.

5. The adjustment apparatus in accordance with claim 1, wherein the adjustment apparatus is a focal adjustment and the optical element is an objective.

6. A camera comprising an adjustment apparatus, comprising a drive, a cam disk rotatable by the drive, and a transmission element which is in contact with a periphery of the cam disk and is connected to an optical element in order thus to convert a rotary movement of the cam disk into an adjustment movement of the optical element, wherein the cam disk is produced from metal in an etching technology, wherein the cam disk has a first wheel in contact with the transmission element and a second wheel which is connected to the first wheel and which is formed as a spoked wheel, the camera having an image sensor with an optical axis, with an objective having the optical element being arranged downstream of the image sensor in the optical axis such that, on an actuation of the drive by moving the cam disk, the focal position of the objective can be set.

7. The camera in accordance with claim 6,
   which is configured as a camera-based code reader and has an evaluation unit which is configured to read out and output code information of a recorded code from image data of the image sensor.

* * * * *